April 15, 1930.   H. L. DARDELET   1,754,938
FASTENING DEVICE WITH INSTANTANEOUS JAMMING
Original Filed May 19, 1925

Patented Apr. 15, 1930

1,754,938

UNITED STATES PATENT OFFICE

HUGUES LOUIS DARDELET, OF NANTES, FRANCE, ASSIGNOR, BY MESNE ASSIGNMENTS, TO DARDELET THREADLOCK CORPORATION, OF NEW YORK, N. Y., A CORPORATION OF DELAWARE

FASTENING DEVICE WITH INSTANTANEOUS JAMMING

Original application filed May 19, 1925, Serial No. 31,392, and in France September 5, 1924. Divided and this application filed June 14, 1926. Serial No. 116,041.

The present invention has for its principal objects to provide a friction gripping self-locking connection between male and female members such, for example, as a bolt and nut; to provide a connection of the foregoing character so constructed that coupled male and female members may be readily intentionally separated and may be substantially instantaneously interfitted and adjusted axially of the connection, and substantially instantaneously locked together, while interfitted, against accidental relative movement; and to provide male and female members having interfitted portions permitting direct or substantially direct endwise adjustment between the members while interfitted and permitting secure locking of the members together in the desired endwise adjusted relation by a slight relative turning movement of pure rotation, or substantially so, between the members.

The improvements include providing the two members to be fastened together with male and female threaded portions, respectively, the threads being preferably of infinite pitch. As embodied in a fastening device comprising a bolt and nut, the profile of the threaded portion of the bolt shank and the profile of the threaded shank receiving aperture in the nut each consists, in a transverse section through the coupled nut and bolt shank, of a spiral line which is a complete, or substantially complete, convolution of an Archimedean spiral extending around the axis of the bolt shank, which line is the profile of the locking face of the thread, and a line connecting the two ends of the spiral line, which latter line is the profile of a shoulder or offset surface on the shank, preferably lying parallel with the shank axis, and forming the non-locking abutment face of the thread. When the nut is placed on the bolt, the abutment faces of the male and female threads are opposed to each other and the spiral friction locking faces of the male and female threads are opposed to each other, said faces being correlated for separation of the locking faces when the abutment faces abut, and for tight frictional jamming of the locking faces upon a slight relative turning movement between the bolt and nut in a direction separating the abutment faces. The desired axial adjustment between a bolt and nut may be instantaneously effected by direct relative sliding motion therebetween with the locking faces released from gripping engagement, whereupon the bolt and nut may be instantaneously locked against accidental relative movement by forcibly imparting a partial turn to either the bolt or the nut with a wrench in a direction separating the abutment faces of the threads.

The following description, with reference to the appended drawings which are given by way of example, discloses the said invention.

Figure 1:
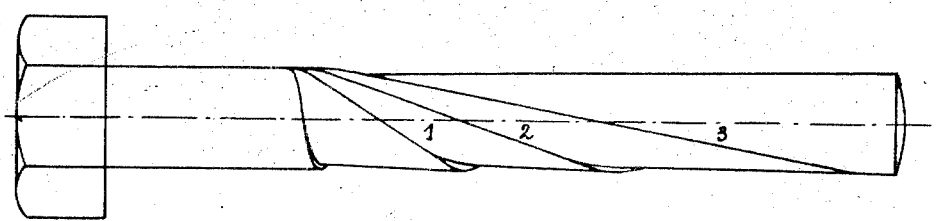
Fig. 1 is a diagram illustrating a bolt in which the threads have an increasing pitch.
Figure 2:
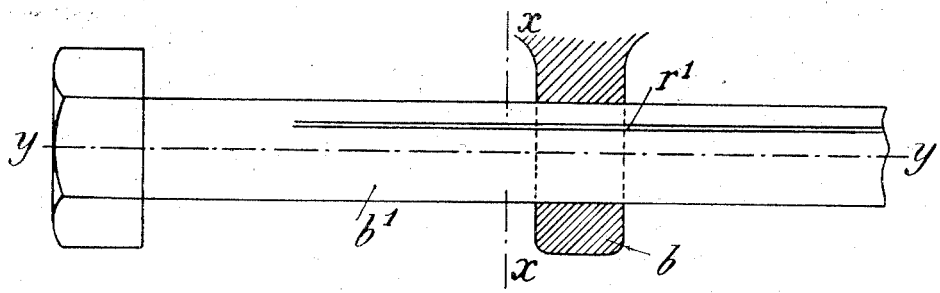
Fig. 2 shows a bolt having an infinite pitch value.

If the pitch value of a bolt is increased as shown at 1, 2 and 3 in Fig. 1, there will be obtained, when the pitch value becomes infinite, a bolt such as is represented at $b^1$ in Fig. 2.

Figure 3:
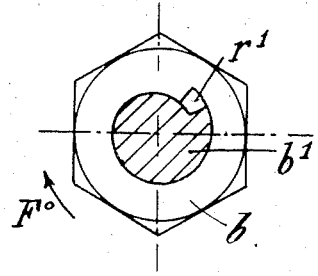
Fig. 3 is a cross section on the line X—X of Fig. 2.

The profiles of the bolt thread and the thread of the nut $b$ in which it is engaged are shown in Fig. 3, and correspond to an Archimedes spiral comprising an offset $r^1$ parallel with the axis $y$—$y$ of the bolt. The said offset may have a considerable height, since the condition required for the jamming action is that the tangent to the spiral at the base of the offset shall form with the tangent to the circumference drawn through this base a smaller angle than the one whose tangent is equal to the friction coefficient of the metals in contact.

It is observed in Fig. 3 that the profile lines of the spiral surfaces are in effect overlapping and slightly staggered sections of a single Archimedean spiral, the male thread profile line approaching the point of origin of the spiral slightly more than the female thread profile line and ending slightly nearer the point of origin of the spiral than the female thread profile line, so that if the bolt is turned in the direction of the arrow F° while the nut is held fast, the result will be a jamming effect which cannot be overcome by any accidental circumstances. This bolt will form a sort of pin or plug capable of producing, in cooperation with its corresponding socket, an instantaneous jamming.

The Archimedean spiral, applied to the coacting surfaces of the bolt and socket, as herein explained, possesses, relatively to all the other spirals and curves and relatively in particular to eccentrics, the following important advantages:

1. When one of the locking members is displaced angularly with respect to the other, the co-acting curved surfaces will coincide, that is to say, will remain in contact, over their whole peripheries. This is not the case with other curves, and particularly with eccentrics, that is, curves obtained by connecting a number of arcs of a circle the one after the other.

2. The pressures are rigorously identical over the entire peripheries of the contacting surfaces when one member is displaced angularly with respect to the other, in consequence whereof the pressure will be uniformly distributed over the whole periphery of the spiral, and an instantaneous jamming of maximum effect will be obtained.

Obviously, my aforesaid device for instantaneous jamming is applicable not only to a bolt and a nut, but to all rods or male pieces and cooperating female pieces.

What I claim is:

1. A two-part fastening device comprising a bolt and a nut, said bolt having a nut penetrating shank portion the major part of the periphery of which extends around the axis of the bolt in the path of the generatrix of an Archimedean spiral, said nut having a reception aperture for said shank portion the major part of the wall surface of which has a spiral curvature complementary to the spiral peripheral surface of said shank portion and is movable into and out of binding engagement with said spiral peripheral surface by relative rotary movements between the nut and bolt, said spiral surfaces having a sufficiently low maximum amount of recession from the axial line of the bolt and nut to afford a self-holding frictional grip upon forcible jamming together of said surfaces by turning effort exerted on one part of the fastening device.

2. A bolt having a nut receiving shank portion the major portion of the periphery of which extends around the axial line of the bolt shank in the path of the generatrix of an Archimedean spiral.

3. A nut having a bolt shank receiving aperture the major portion of the periphery of which extends around the axial line of the nut in the path of the generatrix of an Archimedean spiral.

4. The combination with a male member, of a female member interfitted therewith and bindable thereon by relative rotary movement between the members, the interfitting portions of said male and female members having external and internal profiles, respectively, of the shape of substantially one convolution of an Archimedean spiral.

5. A tight-holding connection for two inter-fitted members, characterized by the fact that said members have two complementary coactive internal and external frictional locking surfaces lying in the path of the generatrix of an Archimedean spiral, and also have two abutment surfaces each uniting the two ends of the spiral locking surface of the member on which it is formed and coactive with its companion abutment to limit rotation between the members in one direction with the locking surfaces out of tight-holding relation, said locking surfaces each having a sufficiently low maximum amount of recession from the axis about which it is generated to afford a self-holding binding engagement between the locking surfaces upon a relative rotary movement between the members separating the abutment surfaces.

In testimony whereof I have signed this specification.

HUGUES LOUIS DARDELET.